(12) United States Patent
Yasuda et al.

(10) Patent No.: US 8,763,456 B2
(45) Date of Patent: Jul. 1, 2014

(54) LIQUID LEVEL DETECTION APPARATUS

(75) Inventors: Atsushi Yasuda, Anjo (JP); Isao Miyagawa, Kariya (JP)

(73) Assignee: Denso Corporation, Kariya (JP)

( * ) Notice: Subject to any disclaimer, the term of this patent is extended or adjusted under 35 U.S.C. 154(b) by 274 days.

(21) Appl. No.: 13/461,189

(22) Filed: May 1, 2012

(65) Prior Publication Data

US 2012/0285240 A1  Nov. 15, 2012

(30) Foreign Application Priority Data

May 10, 2011  (JP) .................................. 2011-105440

(51) Int. Cl.
*G01F 23/38* (2006.01)

(52) U.S. Cl.
USPC .......................................................... 73/317

(58) Field of Classification Search
CPC .................................. G01F 23/38; G01F 23/36
See application file for complete search history.

(56) References Cited

FOREIGN PATENT DOCUMENTS

| JP | H05-003596 | 1/1993 |
|---|---|---|
| JP | 08-282397 | 10/1996 |
| JP | 2001-063406 | 3/2001 |
| JP | 2006-284459 | 10/2006 |
| JP | 2008-195340 | 8/2008 |
| JP | 2010-139490 | 6/2010 |

OTHER PUBLICATIONS

Office Action issued May 7, 2013 in corresponding Japanese Application No. 2011-105440 (with English translation).

*Primary Examiner* — Hezron E Williams
*Assistant Examiner* — Paul West
(74) *Attorney, Agent, or Firm* — Harness, Dickey & Pierce, PLC

(57) ABSTRACT

A liquid level detection apparatus includes a rotation member axially supported by a fixed member. The rotation member includes the following. A contact portion press contacts an end surface making connection between both side surfaces of a magnet member. A pair of elastic deformation portions are protruded from the contact portion; each elastic deformation portion engages with a side surface of the magnet member in an elastically deformed state resulting from press to the magnet. A pair of pawl portions are protruded respectively from the elastic deformation portions while enabling the magnet member to be sandwiched between the contact portion and the pawl portions. A pair of plastic deformation portions are protruded from the elastic deformation portions, respectively; each of the plastic deformation portions engages with the side surface of the magnet member in a plastically deformed state resulting from the press to the magnet.

1 Claim, 3 Drawing Sheets

LIQUID LEVEL DETECTION APPARATUS

CROSS-REFERENCE TO RELATED APPLICATION

This application is based on Japanese Patent Application No. 2011-105440 filed on May 10, 2011, the disclosure of which is incorporated herein by reference.

TECHNICAL FIELD

The present disclosure relates to a liquid level detection apparatus which detects a level of a liquid stored in a tank.

BACKGROUND

[Patent document 1] JP 2006-284459 A

There is conventionally known a liquid level detection apparatus which detects a level of a liquid. In this apparatus, an arm member connects (i) a rotation member whose axis is axially supported by a fixed member fixed to a tank and (ii) a float which floats on the liquid in the tank and moves up-and-down to follow the level of the liquid; such an up-and-down movement is converted into a rotational movement of the rotation member, thereby enabling the detection of the level of the liquid.

Patent document 1 describes one example of such a liquid level detection apparatus in which a magnet, which is fixed to a rotation member, rotates according to an up-and-down movement of a float, thereby generating a magnetic field; the generated magnetic field is detected by a magnetoelectric transducer held at a fixed member. The magnetoelectric transducer thereby outputs an electrical signal indicating the level of the liquid. That is, the apparatus disclosed in Patent document 1 achieves a conversion from the rotational movement to the electrical signal in a non-contact manner between the rotation element and the electrical conversion element: thus, a high durability is obtained. Further, in the apparatus of Patent document 1, the magnet is embedded into the rotation member, thereby stabilizing a holding position of the magnet; the level of the liquid is thus detected based on the detection result of the magnetic field generated by the magnet. This improves the detection accuracy.

In the apparatus of Patent document 1, the magnet is embedded in a rotation member using an insert molding which needs a complicated molding operation; thereby, the productivity may not be improved.

SUMMARY

It is an object of the present disclosure to provide a liquid level detection apparatus enabling a high durability, a high detection accuracy, and a high productivity.

To achieve the above object, according to an aspect of the present disclosure, a liquid level detection apparatus is provided as follows. The liquid level detection apparatus detects a liquid level of a liquid stored in a tank. The liquid level detection apparatus includes the following; a fixed member that is fixed to the tank; a rotation member that is axially supported by the fixed member; a float that floats on the liquid in the tank and performs an up-and-down movement according to the liquid level; an arm member that makes a connection between the float and the rotation member, the arm member converting the up-and-down movement of the float into a rotational movement of the rotation member; a magnet that is held by the rotation member and rotates integrally with the rotation member; and a magnetoelectric transducer that is held by the fixed member and detects a magnetic field generated by the magnet, the magnetoelectric transducer outputting an electrical signal indicating the liquid level. The rotation member includes the following: a contact portion that press contacts an end surface making a connection between both side surfaces of the magnet; a pair of elastic deformation portions that are protruded from the contact portion, the elastic deformation portions engaging, respectively, with the both side surfaces of the magnet in an elastically deformed state resulting from a press to the magnet; a pair of pawl portions that are protruded from the elastic deformation portions, respectively, the magnet being sandwiched in between the contact portion and the pawl portions; and a plastic deformation portion that is protruded from at least one of the elastic deformation portions serving as a protrusion origin, the plastic deformation portion engaging in a plastically deformed state with the side surface of the magnet facing the elastic deformation portion serving as the protrusion origin, the plastically deformed state resulting from the press to the magnet.

Under the above configuration, each elastic deformation portion is protruded from the contact portion of the rotation member; the each elastic deformation portion is pressed to the magnet by a snap fitting manipulation, thereby being elastically deformed. Thus, the each elastic deformation portion can be easily engaged with each side surface of the magnet, individually. At the same time, according to the snap fitting manipulation, the magnet can be easily inserted, in the rotation member, in between (i) the contact portion that press contacts the end surface of the magnet and (ii) each pawl portion individually protruded from each elastic deformation portion. Thus, the magnet can be held by the rotation member using an easy engagement and an insertion. This configuration can provide a high productivity relative to the liquid level detection apparatus which requires this holding configuration.

Furthermore, after the snap fitting manipulation, this holding structure can provide two types of engagement, i.e., a plastically deformed state as well as an elastically deformed state. The elastically deformed state is achieved by each elastic deformation portion engaging with each side surface of the magnet; the plastically deformed state is achieved by the plastic deformation portion, which is protruded from at least one of the two elastic deformation portions in the rotation member, engaging with the corresponding side surface of the magnet. According to such engagement configuration, the holding position of the magnet held by the rotation member can be stabilized in between the two elastic deformation portions as well as in between the contact portion and the pawl portion. Further, the magnet held by the rotation member is rotated according to the up-and-down movement of the float following a liquid level, thereby generating a magnetic field. The generated magnetic field is detected by the magnetoelectric transducer held by the fixed member. The magnetoelectric transducer thus outputs an electrical signal indicating the liquid level, achieving a noncontact type of a liquid level detection apparatus. Therefore, the stabilization of the holding position of the magnet provides a high detection accuracy of the liquid level based on the detection result of the magnetic field generated by the magnet, and a higher durability by achieving a noncontact manner of the conversion, which is from the rotational movement to the electrical signal, between a rotation element and an electrical conversion element. Furthermore, the plastic deformation of the plastic deformation portion effectively raises the detection accuracy: this can be achieved by using a press to the magnet without interfering with the easy snap fitting manipulation. Thus, a high detection accuracy and a high durability can be provided while providing a high productivity.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

The inventors have been studied a technology as follows. The rotation member 1000 is provided with a contact portion 1001, an elastic deformation portion 1002, and a pawl portion 1003; a magnet 1100 is held by cooperation of those portions 1001 to 1003.

In specific, the contact portion 1001 of the rotation member 1000 press-contacts (or makes a press-contact with) an end surface 1102 that connects both side surfaces 1101 of the magnet 1100. Each elastic deformation portion 1002 of the rotation member 1000 is protruded from the contact portion 1001, and is pressed towards the magnetic member 1100 to thereby be deformed elastically. Under this state, each elastic deformation portion 1002 is engaged with each side surface 1101 of the magnet 1100, individually. Furthermore, each pawl portion 1003 is protruded from each elastic deformation portion 1002 in the rotation member 1000 and is arranged so as to sandwich the magnet 1100 with the contact portion 1001.

Under such a configuration, each elastic deformation portion 1002 can be engaged with the magnet 1100 through an easy snap fitting manipulation; simultaneously, the magnet 1100 can be held in between each pawl portion 1003 and the contact portion 1001. Thereby the productivity can be raised. In addition, after the snap fitting manipulation, each elastic deformation portion 1002 is engaged with each side surface 1101 of the magnet 1100 in an elastic deformation state; thus, the holding position of the magnet 1100 by the rotation member 1000 is stabilized in between each elastic deformation portion 1002. Thereby, the detection accuracy can be raised.

However, in order to realize such a holding state certainly regardless of the difference between products, a gap g in between the magnetic member 1100 and the pawl portion 1003 needs to be secured while considering a manufacture tolerance. In such a case, the holding position of the magnet 1100 tends to shift easily in between each pawl portion 1003 and the contact portion 1001. Thereby, when an external force such as an impact is applied, an output signal from the magnetoelectric transducer may vary.

To that end, the inventors further studied and achieved the present disclosure.

Embodiment

Figure 1:
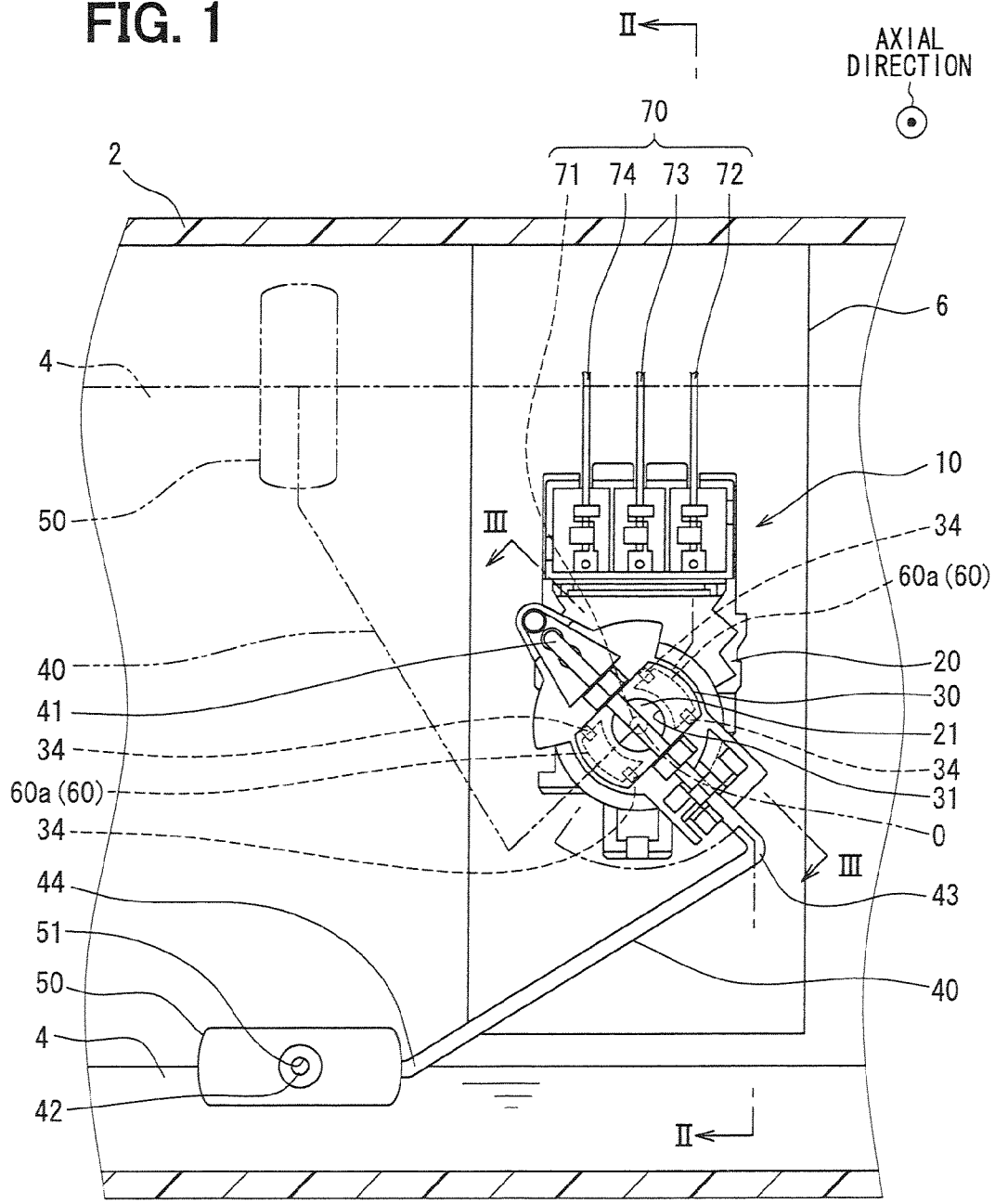
FIG. 1 is a front view illustrating a liquid level detection apparatus according to an embodiment of the present disclosure.
Figure 2:
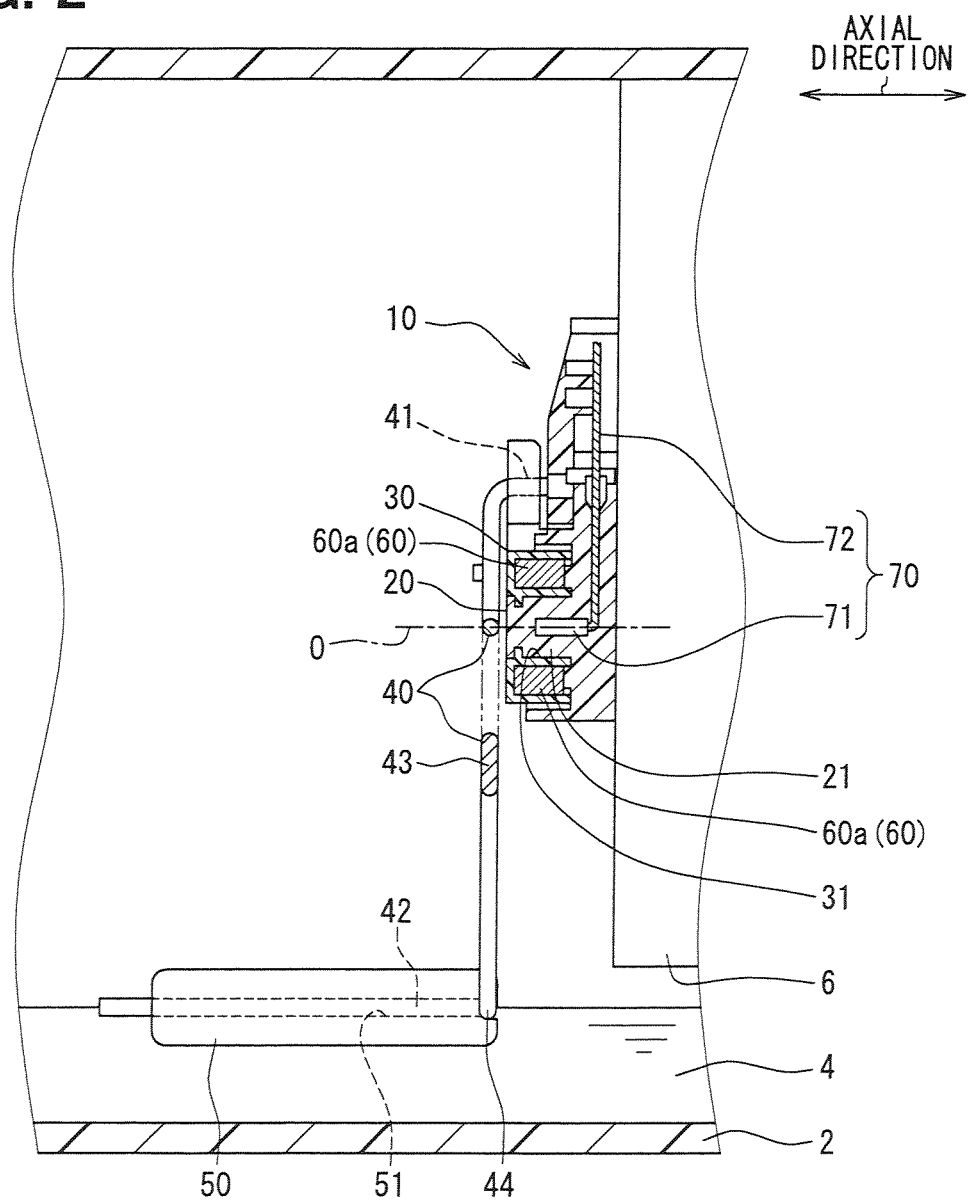
FIG. 2 is a sectional view in II-II line of FIG. 1 while a rotation axis is extended in a right-and-left direction.

FIGS. 1 and 2 illustrate an example of a liquid level detection apparatus 10 in a fuel tank 2 in a vehicle according to an embodiment of the present disclosure. The liquid level detection apparatus 10 detects a level (also referred to as a height or a liquid level) of a fuel 4 as a liquid stored in the fuel tank 2, and outputs an electrical signal indicating a result of the detection to an instrument panel or combination meter (not shown) of the vehicle.

Basic Configuration

First, a basic configuration of the liquid level detection apparatus 10 is explained. As indicated in FIGS. 1 and 2, the liquid level detection apparatus 10 includes a fixed member 20, a rotation member 30, an arm member 40, a float 50, a magnet 60, and a sensor 70.

The fixed member 20 made of resin is fixed to an inner wall of the fuel tank 2 via a fuel pump module 6 for discharging the fuel from the inside of the fuel tank 2. The fixed member 20 has a cylindrical axis portion 21 protruding in the approximately horizontal direction in the vehicle on the horizontal plane.

The rotation member 30 made of resin has a cylindrical journal hole member 31 penetrating in the approximately horizontal direction in the vehicle on the horizontal plane. This journal hole member 31 is axially supported by the axis portion 21 of the fixed member 20; thereby, the rotation member 30 can rotate freely around a rotation axis O in the inside of the fuel tank 2.

The arm member 40 made of metal is formed in a round bar shape bent at both end portions 41, 42 and intermediate portions 43, 44. Of such bent portions 41 to 44, the end portion 41 is inserted in the rotation member 30; thereby, the arm member 40 can swing freely around the rotation axis O in the inside of the fuel tank 2.

The float 50 is made of rubber or resin of which specific gravity is less than that of the fuel 4; the float 50 has a communicating hole member 51 penetrating in the approximately horizontal direction in the vehicle on the horizontal plane. This communicating hole member 51 is put around the end portion 42 of the arm member 40; thereby, the float 50 is linked with the rotation member 30 to be floated on the fuel 4 in the inside of the fuel tank 2. Under the above configuration, the float 50 moves up and down according to the liquid level of the fuel 4; thereby, such an up-and-down movement is converted into a rotational movement of the rotation member 30 via the arm member 40.

The magnet 60 made from ferromagnetic material is formed as two magnet members 60a, each of which has a partial ring shape having a fan-shaped cross-section centering on the rotation axis O; the two magnet members 60a of the magnet 60 are held by the rotation member 30 in a state where the two magnet members 60a sandwich radially the axis portion 21 of the fixed member 20 to be arranged at two sides of the axis portion 21, respectively. Each magnet member 60a is magnetic, thereby always generating a magnetic field in a space between the two magnet members 60a while rotating along with the rotation member 30.

The sensor 70 includes a magnetoelectric transducer 71 and several terminals 72, 73, 74. The magnetoelectric transducer 71 is a Hall element or a magnetoresistive element, for example. The magnetoelectric transducer 71 is embedded inside of the axis portion 21 by an insert molding, thereby being held by the fixed member 20 in a state to be located in between the two magnet members 60a. The magnetoelectric transducer 71 detects or senses a magnetic field generated in between the magnet members 60a, thereby outputting an electrical signal so as to indicate a rotation angle of the rotation member 30 rotating integrally along with the magnet members 60a of the magnet 60. The rotation angle of the rotation member 30 serves as a physical quantity which follows an up-and-down movement of the float 50 according to the liquid level of the fuel 4. The output signal of the magnetoelectric transducer 71 turns into an electrical signal that indicates a liquid level substantially. Thus, the liquid level detection apparatus 10 detects the magnetic field generated by the magnet 60, which is held by the rotation member 30 and rotates according to the liquid level, using the magnetoelectric transducer 71 held by the fixed member 20. Thereby, the liquid level detection apparatus 10 outputs the electrical signal indicating the liquid level, thus being a noncontact type with a high durability.

Each metal terminal 72 to 74 is embedded in the fixed member 20, under a state where each terminal 72 to 74 is electrically connected with the magnetoelectric transducer 71. It is noted that the terminal 74 functions as a terminal which supplies an operation voltage from an external side to the magnetoelectric transducer 71. The terminal 73 functions as a terminal which supplies a ground voltage from an external side to the magnetoelectric transducer 71. The terminal 72 functions as a terminal which transmits an electrical signal, which is outputted from the magnetoelectric transducer 71, to an external side.

Characteristic Configuration

Figure 3:
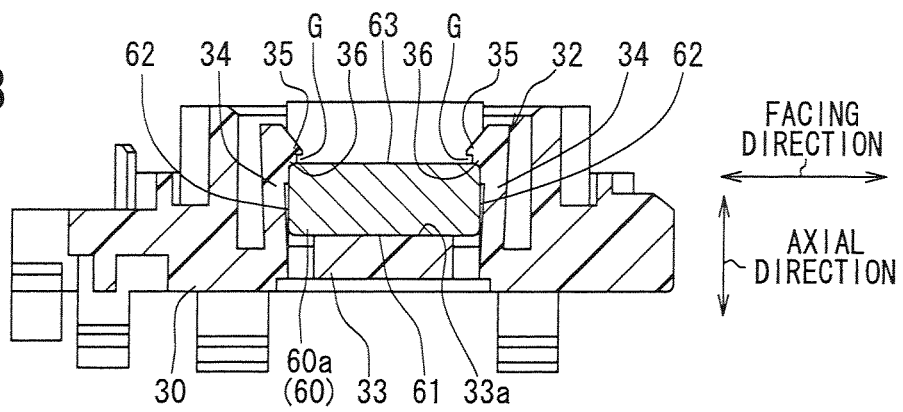
FIG. 3 is a view enlarging a sectional view in line of FIG. 1 while the rotation axis is extended in an up-and-down direction behind the view.

The following will explain a characteristic configuration of the liquid level detection apparatus 10 with reference to FIG. 3. It is noted that in FIG. 2, the rotation axis O is illustrated to be extended in a horizontal direction (i.e., right-and-left direction in the drawing), whereas in FIG. 3, the rotation axis O is extended in an up-and-down direction behind the illustrated view. The rotation member 30 provides a holding configuration 32 to hold each magnet member 60a of the magnet 60, as indicated in FIG. 3; of the rotation member 30, the contact portion 33, the elastic deformation portion 34, the pawl portion 35, and the plastic deformation portion 36 are formed integrally with a resin molding. It is noted that the holding configuration 32 for each of the magnet members 60a has a configuration substantially identical to each other. Thus, the following will explain only one of the holding configurations 32 in detail, while omitting the other one.

In this holding configuration 32, the contact portion 33 has a contact surface 33a which makes a pressed-contact, in a surface-to-surface state, with an end surface 61 of the magnet member 60a shaped of a partial sector ring; the end surface 61 of the magnet member 60a is formed to extend in a right-and-left direction in FIG. 3. This right-and-left direction in FIG. 3 is approximately orthogonal to an axial direction that is defined as being parallel with the rotation axis O. That is, the contact surface 33a of the contact portion 33 faces and press-contacts the end surface 61 of the magnet member 60a while the press direction is identical to the axial direction.

The two elastic deformation portions 34, which are protruded from the contact portion 33 in the axial direction, are arranged at two positions that sandwich the magnet member 60a from both sides of the magnet member 60a along a circumferential direction centering on the rotation axis O, respectively (also refer to FIG. 1). That is, in the present embodiment, the two elastic deformation portions 34 serving as a pair are provided with respect to one magnet member 60a; the two elastic deformation portions relative to the one magnet member 60a face each other. Each one of the two elastic deformation portions 34 is engaged with the corresponding one of both side surfaces 62 of the magnet member 60a. The both side surfaces 62 of the magnet member 60a are connected with each other via the end surface 61. Each elastic deformation portion 34 is provided to undergo an elastic deformation in a facing direction that is defined as a direction in which the elastic deformation portions 34 face each other via the magnet member 60a. The elastic deformation portion 34 is pressed towards the corresponding side surface 62 of the magnet member 60a by own elastic restoring force, thereby being engaged with the corresponding side surface 62 in an elastically deformed state.

Each of the pawl portions 35 is protruded in the facing direction from the corresponding one of the elastic deformation portions 34, in the shape of a hook. The two pawl portions 35 are disposed at two positions, which are disposed on the side that is opposite the contact portion 33 with respect to the magnet member 60a, respectively. That is, in the present embodiment, for each magnet member 60a of the magnet 60, a single pair of two pawl portions 35 is provided; the two pawl portions 35 serving as a single pair face each other in a direction identical to the facing direction in which the two elastic deformation portions 34 face each other via the magnet member 60a. Each pawl portion 35 is provided such that a gap G is formed, in the axial direction, in between (i) the each pawl portion 35 and (ii) an end surface 63 of the magnet member 60a that is opposite the end surface 61 of the magnet member 60a. This gap G results from the consideration of the manufacture tolerance. Thereby, the magnet member 60a is sandwiched in between (i) the two pawl portions 35 and (ii) the contact portion (33).

Figure 4:
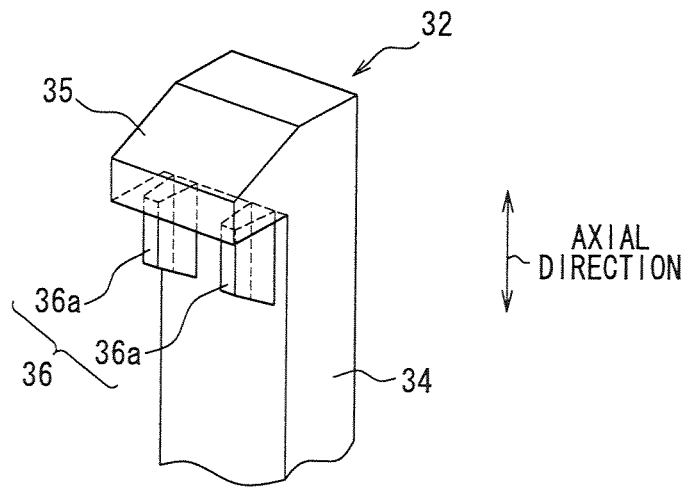
FIG. 4 is a perspective view of a main part of the rotation member before a magnetic member is assembled.

Further, with reference to FIG. 4, the plastic deformation portion 36 is protruded in the facing direction from the elastic deformation portion 34 that serves as a protrusion origin. As illustrated in FIG. 4, the plastic deformation portion 36 includes two sub-portions 36a. Further, with reference to FIG. 3, for each magnet member 60a, at least a single pair of the plastic deformation portions 36 is provided such that the plastic deformation portions 36 face each other in a direction identical to the facing direction of the elastic deformation portions 34. Also refer to FIG. 1, the magnet member 60a is sandwiched in between the two elastic deformation portions 34 in the facing direction, also in the circumferential direction centering on the rotation axis O. Similarly, the magnet member 60a is sandwiched in between the two elastic deformation portions 34 in the facing direction, also in the circumferential direction relative to the rotation axis O. Each plastic deformation portion 36 is individually pressed to the side surface 62 facing the elastic deformation portion 34 serving as the protrusion origin of the each plastic deformation portion 36. As indicated in FIG. 4, before the magnet member 60a is assembled into the holding configuration 32, each sub-portion 36a of the plastic deformation portion 36 has a convex shaped cross-section whose protrusion is shorter than that of the pawl portion 35. In the present embodiment, when the magnet member 60a is assembled or embedded into the holding configuration 32, each plastic deformation portion 36 is pressed and crushed against the corresponding side surface 62 of the magnet member 60a, thereby engaging with the corresponding side surface 62 in a plastically deformed state, as indicated in FIG. 3.

The assembling of the magnet member 60a into the holding configuration 32 is performed by a snap fitting manipulation. In detail, the magnet member 60a is fitted in between the two elastic deformation portions 34 by applying an elastic deformation to each of the two elastic deformation portions 34 towards an inverse side that is inverse to a side facing the other elastic deformation portion 34. Such a fit-in manipulation enables the magnet member 60a to press contact the contact portion 33; then, the each elastic deformation portion 34 is returned towards the facing side from the inverse side. Each elastic deformation portion 34 is engaged with the corresponding side surface 62 in an elastically deformed state by being pressed by the magnet member 60a. Simultaneously, each plastic deformation portion 36 is engaged with the corresponding side surface 62 in a plastically deformed state by being pressed forcibly to the facing side by the fit-in force resisting the elastic restoring force of the elastic deformation portion 34. In addition, each pawl portion 35 faces the end surface 63 of the magnet member 60a in the axial direction in conjunction with the restoration of the elastic deformation portion 34. Thereby, the magnet member 60a is sandwiched in between the contact portion 33 and each pawl portion 35. Thus, in the present embodiment, the snap fitting manipulation can easily achieve a series of the engagement and the insertion for holding the magnet member 60a or the magnet 60 in the holding configuration 32. This configuration can provide a high productivity relative to the liquid level detection apparatus 10 which requires the holding configuration.

Furthermore, after the snap fitting manipulation, this holding structure can provide the engagement configuration in the elastically deformed state of each elastic deformation portion 34 and the engagement configuration in the plastically deformed state of each plastic deformation portion 36, with respect to each side surface 62 of the magnet member 60a. In particular, each plastic deformation portion 36 is crushed by the press to the magnet 60; therefore, the engagement configuration where each plastic deformation portion 36 is pressed to each side surface 62 can be provided in both sides of the magnet member 60a in the circumferential direction centering on the rotation axis O. The holding strength for holding the magnet member 60a using those plastic deformation portions 36 becomes high, irrespective of the existence of the gap G. Thus, the holding position of the magnet member 60a or the magnet 60 by the rotation member 30 can be stabilized certainly in the axial direction as well as the facing direction. The facing direction is a direction in which the two elastic deformation portions 34 from which the plastic deformation portions 36 are protruded, respectively, face each other via the magnet member 60a; the axial direction is a direction in which the pawl portions 35 face the contact portion 33 via the magnet member 60a. Therefore, irrespective of the application of an external force such as an impact, the magnet 60 does not separate from a regular position. Based on a magnetic field generated by the above-configured magnet 60, the magnetoelectric transducer 71 outputs a signal indicating a liquid level. The detection accuracy of the liquid level can also be raised.

Other Embodiments

Up to this point, description has been given to one embodiment of the present disclosure. However, the present disclosure is not limited to the above embodiment, and it can be variously embodied within a scope not departing from the subject matter of the present disclosure.

Figure 5:
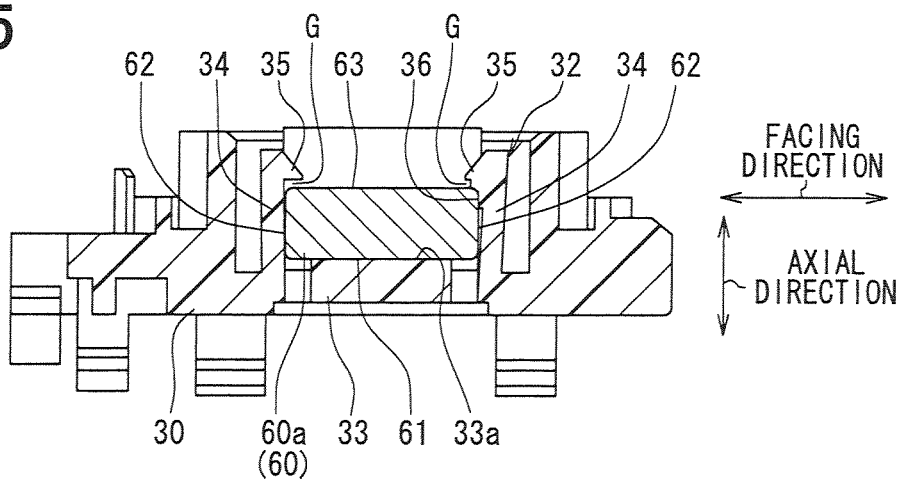
FIG. 5 is a sectional view illustrating a modification example of FIG. 3.
Figure 6:
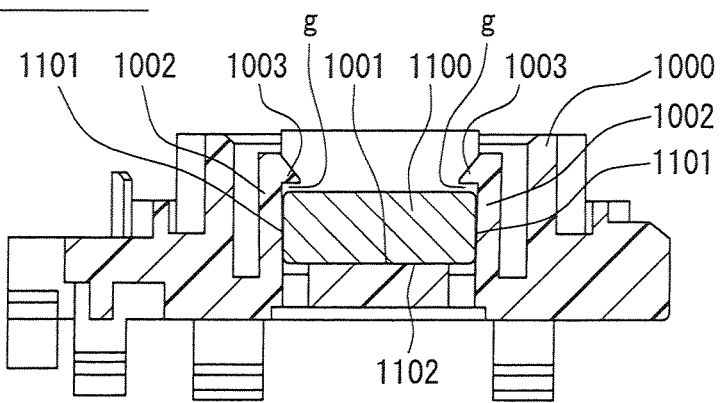
FIG. 6 is a sectional view explaining a related art.

In specific, more than one pair of the elastic deformation portions 34 facing each other may be provided for each of the magnet member 60a in another embodiment. In such a case, for example, at least one pair may be provided to face each other in the radial direction centering on the rotation axis O. The number of pairs of the two pawl portions 35 which face each other may be more than one, and identical or not identical to the number of pairs of the elastic deformation portions 34. Furthermore, the number of pairs of the plastic deformation portions 36 facing each other may be more than one. Alternatively, as a modification in FIG. 5, one or more than one plastic deformation portion 36 may be provided to be protruded from only one of the two elastic deformation portions 34.

In addition, the shape of the plastic deformation portion 36 before assembling the magnet 60 may be differentiated. That is, as long as the shape is enabled to undergo a plastic deformation, the shape need not be limited to the convex shape or having the convex cross-section. In addition, with respect to the plastic deformation, as long as it can raise the holding strength for holding the magnet 60, a swage deformation may be applied other than the crushing deformation, for instance. Furthermore, in addition, the present disclosure is applicable to an apparatus which detects a liquid level of a different liquid stored in a hollow tank other than the liquid level detection apparatus 10 which detects the level of the fuel stored in the fuel tank 2.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:
1. A liquid level detection apparatus that detects a liquid level of a liquid stored in a tank, the liquid level detection apparatus including:
 a fixed member that is fixed to the tank;
 a rotation member that is axially supported by the fixed member;
 a float that floats on the liquid in the tank and performs an up-and-down movement according to the liquid level;
 an arm member that connects the float with the rotation member, the arm member converting the up-and-down movement of the float into a rotational movement of the rotation member;
 a magnet member that is held by the rotation member and rotates integrally with the rotation member, the magnet member including (i) two side surfaces defined as a first side surface and a second side surface that oppose to each other and (ii) two end surfaces defined as a first end surface and a second end surface that oppose to each other; and
 a magnetoelectric transducer that is held by the fixed member and detects a magnetic field generated by the magnet member, the magnetoelectric transducer outputting an electrical signal indicating the liquid level,
 the rotation member comprising:
 a contact portion that is in pressing contact with the first end surface that links between the first side surface and the second side surface of the magnet member;
 a pair of elastic deformation portions defined as a first elastic deformation portion and a second elastic deformation portion that protrude from a first position and a second position on the contact portion, respectively, so as to oppose each other while sandwiching the magnet member,
 the first elastic deformation portion and the second elastic deformation portion being elastically deformed when the magnetic member is inserted between the first elastic deformation portion and the second elastic deformation portion so that the first elastic deformation portion and the second elastic deformation por- tion are engaged with the first side surface and the second side surface of the magnet member, respectively;

a pair of pawl portions being defined as a first pawl portion and a second pawl portions that oppose each other by protruding in opposing directions from the first elastic deformation portion and the second elastic deformation portion, respectively, wherein the magnet member is positioned between (i) the contact portion and (ii) each of the first pawl portion and the second pawl portion with a gap between (i) each of the first pawl portion and the second pawl portion and (ii) the second end surface of the magnet member opposite to the contact portion; and a pair of plastic deformation portions defined as a first plastic deformation portion and a second plastic deformation portion that protrude from a first protruding origin area and a second protrusion origin area on the first elastic deformation portion and the second elastic deformation portion, respectively, each of the first protrusion origin area and the second protrusion origin area on the first elastic deformation portion and the second elastic deformation portion extending from each of the first pawl portion and the second pawl portion, respectively, towards the contact portion, wherein each of the first plastic deformation and the second plastic deformation portion is engaged with the magnet member so as to be plastically deformed in a crushed state along both (i) the second end surface and (ii) each of the first side surface and the second side surface of the magnet member due to a pressing force from an edge defined between (i) the second end surface and (ii) each of the first side surface and the second side surface of the magnet member, respectively.

* * * * *